(12) United States Patent
Takiguchi et al.

(10) Patent No.: US 11,370,930 B2
(45) Date of Patent: Jun. 28, 2022

(54) SOLVENT-BASED INK COMPOSITION (71) Applicant: Seiko Epson Corporation, Tokyo (JP)

(72) Inventors: Hiroshi Takiguchi, Matsumoto (JP); Hiroaki Kida, Shiojiri (JP); Masaru Terada, Suwa (JP); Naoyuki Toyoda, Suwa (JP); Atsushi Denda, Chino (JP)

(73) Assignee: Seiko Epson Corporation

( * ) Notice: Subject to any disclaimer, the term of this patent is extended or adjusted under 35 U.S.C. 154(b) by 386 days.

(21) Appl. No.: 16/477,037

(22) PCT Filed: Dec. 25, 2017

(86) PCT No.: PCT/JP2017/046336
§ 371 (c)(1),
(2) Date: Jul. 10, 2019

(87) PCT Pub. No.: WO2018/131445
PCT Pub. Date: Jul. 19, 2018

(65) Prior Publication Data
US 2021/0284856 A1 Sep. 16, 2021

(30) Foreign Application Priority Data
Jan. 11, 2017 (JP) .............................. JP2017-002690

(51) Int. Cl.
| | |
|---|---|
| *C09D 11/322* | (2014.01) |
| *C09D 11/102* | (2014.01) |
| *C09D 167/02* | (2006.01) |
| *C09D 171/02* | (2006.01) |
| *C09D 11/38* | (2014.01) |
| *B41J 2/01* | (2006.01) |
| *C08G 65/335* | (2006.01) |
| *C09D 11/36* | (2014.01) |
| *B41M 5/00* | (2006.01) |
| *C08K 5/521* | (2006.01) |
| *C08K 7/00* | (2006.01) |
| *C08K 9/04* | (2006.01) |
| *C08K 3/08* | (2006.01) |

(52) U.S. Cl.
CPC ............... *C09D 11/322* (2013.01); *B41J 2/01* (2013.01); *C08G 65/3353* (2013.01); *C09D 11/102* (2013.01); *C09D 11/36* (2013.01); *C09D 11/38* (2013.01); *C09D 167/02* (2013.01); *C09D 171/02* (2013.01); *B41M 5/00* (2013.01); *C08K 5/521* (2013.01); *C08K 7/00* (2013.01); *C08K 9/04* (2013.01); *C08K 2003/0812* (2013.01); *C08K 2201/003* (2013.01)

(58) Field of Classification Search
CPC .......... B41J 2/01; B41M 5/00; C09D 11/322; C09D 11/102; C09D 11/38; C09D 167/02; C09D 171/02; C08G 65/3353; C08K 5/521; C08K 7/00; C08K 9/04; C08K 2003/0812; C08K 2201/003
See application file for complete search history.

(56) References Cited

U.S. PATENT DOCUMENTS

| | | | |
|---|---|---|---|
| 11,126,098 B2* | 9/2021 | Saito | G03G 15/0865 |
| 2008/0081864 A1 | 4/2008 | Takano | |
| 2011/0008613 A1 | 1/2011 | Takano et al. | |
| 2012/0295076 A1 | 11/2012 | Toyoda et al. | |
| 2015/0096466 A1 | 4/2015 | Denda et al. | |
| 2015/0112003 A1 | 4/2015 | Toyoda et al. | |
| 2016/0346837 A1* | 12/2016 | Sawada | C22C 27/06 |

FOREIGN PATENT DOCUMENTS

| | | |
|---|---|---|
| JP | H09-087562 A | 3/1997 |
| JP | 2003-213157 A | 7/2003 |
| JP | 2006-169393 A | 6/2006 |
| JP | 2009-215411 A | 9/2009 |
| JP | 2012-255143 A | 12/2012 |
| JP | 2015-071700 A | 4/2015 |
| JP | 2015-108110 A | 6/2015 |

* cited by examiner

*Primary Examiner* — Patrick D Niland
(74) *Attorney, Agent, or Firm* — Harness, Dickey & Pierce, P.L.C.

(57) ABSTRACT

A solvent-based ink composition is provided that includes: an organic solvent; a surface-treated metal powder; and a polyoxyethylene alkyl ether phosphoric acid compound, the content of the polyoxyethylene alkyl ether phosphoric acid compound with respect to the total mass of an ink is 0.1 to 10.0 percent by mass, and the surface-treated metal powder contains aluminum or an aluminum alloy and is surface-treated by a surface treating agent of a fluorine-based compound.

11 Claims, 3 Drawing Sheets

SOLVENT-BASED INK COMPOSITION

BACKGROUND

Technical Field

The present invention relates to a solvent-based ink composition.

Related Art

Since being capable of recording a highly fine image by a relatively simple apparatus, an ink jet recording method has been rapidly developed in various fields. In particular, in order to stably obtain a high quality recorded material, various investigations have been carried out.

For example, in order to provide an ultraviolet ray curable ink jet composition which has, besides an excellent storage stability, an excellent curing property; which has a printed portion excellent in glossy touch and abrasion resistance; and which may be preferably used for manufacturing a printed material excellent in durability, Japanese Unexamined Patent Application Publication No. 2012-255143 has disclosed an ultraviolet ray curable ink jet composition which is ejected by an ink jet method and which includes a polymerizable compound, surface-treated metal particles, and a material having a specific partial structure.

Since suppressing the gelation which is caused by the activity of the metal particles to the polymerizable compound, the ultraviolet ray curable ink jet composition as disclosed in JP 2012-255143 has an excellent durability. According to the ultraviolet ray curable ink composition as described above, the polymerizable compound functions as a primary solvent, and on the other hand, a composition which uses an organic solvent as a primary solvent is a solvent-based ink composition. Although those ink compositions as described above are common to each other since a reaction of the metal particles in the solvent may cause a problem, primary objects of the reaction thereof are different from each other. That is, in the ultraviolet ray curable ink composition, a reaction between the metal particles and the polymerizable compound is a major problem, and on the other hand, in the solvent-based ink composition, a reaction between the metal particles and impurities, such as water and oxygen, and aggregation of the metal particles caused thereby are major problems. Even if the ultraviolet ray curable ink composition as disclosed in JP 2012-255143 is changed into a solvent-based ink composition by using an organic solvent as a primary solvent without changing the metal particles and is then ejected by an ink jet method, an excellent ejection stability cannot be obtained.

In general, when an ink composition containing metal particles is ejected by an ink jet method, as the average particle diameter of the metal particles is decreased, the ejection stability tends to be improved. The reasons for this are believed that the metal particles are processed into highly fine particles, and the number of large and coarse particles is decreased.

On the other hand, since flaky shaped metal particles have a high anisotropic property, when a piezoelectric type ink jet method is used, an ejection defect is liable to be generated; hence, if the particle diameters of the metal particles are not decreased, a preferable ejection stability is not likely to be obtained. On the other hand, when the particle diameters of the metal particles are decreased, a coating film to be obtained by ejection may not have a preferable glossy property. The reason for this is believed that the aspect ratio of the metal particles is decreased as the metal particles are processed into highly fine particles. In addition, the reason is also believed that in a process in which the gloss is gradually obtained while an organic solvent contained in the ink composition is dried or adsorbed, since being liable to be influenced by a convection flow, the metal particles are not likely to be arranged in parallel to the surface of a recording medium. For example, when metal particles having an average particle diameter of 1 μm or less are used, the degradation in gloss may become serious in some cases.

When the surfaces of the metal particles are processed using a hydrophobic surface treating agent, the surface free energy of the metal particles is decreased, and in a process in which the ink composition is dried, while the metal particles are arranged along gas-liquid interfaces of liquid droplets, the organic solvent is adsorbed and dried, so that a highly glossy state can be maintained (also called "leafing effect"). In particular, when metal particles processed by a fluorine-based surface treating agent are used, a higher glossy state tends to be obtained.

However, an ink composition containing metal particles which use a fluorine-based surface treating agent may have a lower compatibility with a predetermined organic solvent in some cases, and when a method, such as a piezoelectric type ink jet method, in which an ink composition is ejected by a piezoelectric element at a high rate by a high frequency is used, since the dispersibility of the metal particles is degraded, an excellent ejection stability tends to be not obtained. The reason for this is believed that since being interfered with each other, the metal particles having a high anisotropic property and low surface free energy cannot follow at a high rate the movement of the organic solvent which flows together with the piezoelectricity.

Accordingly, the present invention was made to solve the above problem and aims to provide a solvent-based ink composition having an excellent ejection stability when the composition is ejected by an ink jet method. In particular, the present invention aims to provide a solvent-based ink composition having an excellent ejection stability even when the composition is ejected at a high frequency and at a high flying speed by a piezoelectric type ink jet method.

SUMMARY

Through intensive research carried out by the present inventors to solve the above problem, the following was found. That is, it was found that by the use of a solvent-based ink composition which comprises an organic solvent; a surface-treated metal powder; and a polyoxyethylene alkyl ether phosphoric acid compound, and in which the content of the polyoxyethylene alkyl ether phosphoric acid compound with respect to the total mass of an ink is 0.1 to 10.0 percent by mass, and the surface-treated metal powder contains aluminum or an aluminum alloy and is surface-treated by a surface treating agent of a fluorine-based compound, since a high dispersion stability is obtained, a long-term storage stability is high, and the ejection stability is also excellent.

In addition, in the above solvent-based ink composition, since the polyoxyethylene alkyl ether phosphoric acid compound is included, a molecular steric hindrance is newly introduced onto the surface of the metal powder, the distances between particles of the metal powder are each not excessively decreased, the interference between the metal particles is suppressed, the aggregation thereof at a high frequency is suppressed, and hence, the ejection stability is improved. As a result, it was found that while an excellent glossy property is obtained, the ejection stability is also excellent, so that the present invention was made.

That is, the present invention is a solvent-based ink composition which comprises: an organic solvent; a surface-treated metal powder; and a polyoxyethylene alkyl ether phosphoric acid compound, the content of the polyoxyethylene alkyl ether phosphoric acid compound with respect to the total mass of an ink is 0.1 to 10.0 percent by mass, and the surface-treated metal powder contains aluminum or an aluminum alloy and are surface-treated by a surface treating agent of a fluorine-based compound.

In addition, in the solvent-based ink composition of the present invention, the polyoxyethylene alkyl ether phosphoric acid compound is preferably a compound represented by the following formula or a salt thereof.

(In the formula, R represents an alkyl group, n indicates an integer of 1 or more, and m indicates an integer of 1 to 3.)

Furthermore, in the solvent-based ink composition of the present invention, the above polyoxyethylene alkyl ether phosphoric acid compound is more preferably a polyoxyethylene alkyl ether phosphoric acid in which n in the above formula indicates 1 to 25, the average particle diameter of the surface-treated metal powder is preferably 0.2 to 1.0 μm, the shape of the surface-treated metal powder is preferably flaky, and the average thickness of the surface-treated metal powder is more preferably 10 to 90 nm.

DETAILED DESCRIPTION

Hereinafter, if needed, with reference to the drawings, an embodiment (hereinafter, referred to as "this embodiment") carrying out the present invention will be described in detail. The following embodiment is described by way of example to explain the present invention and is not intended to limit the present invention to the following context. The present invention may be performed after being appropriately changed within the scope of the present invention. In addition, in the drawings, the identical elements are designated by the same reference numeral, and duplicated description is omitted. In addition, the positional relationship, such as up and down and left to right, is based on the positional relationship shown in the drawing unless otherwise particularly noted. Furthermore, the dimensional ratios of the drawings are not limited to the ratios shown in the drawings.
Solvent-Based Ink Composition A solvent-based ink composition (hereinafter, also referred to as "solvent-based composition", "ink composition", or "composition" in some cases) of this embodiment includes an organic solvent, a surface-treated metal powder, and a polyoxyethylene alkyl ether phosphoric acid compound. In addition, the content of the polyoxyethylene alkyl ether phosphoric acid compound with respect to the total mass of an ink is 0.1 to 10.0 percent by mass. Furthermore, the surface-treated metal powder contains aluminum or an aluminum alloy and is surface-treated by a surface treating agent of a fluorine-based compound. In this embodiment, the "solvent-based" indicates that an organic solvent is used as a primary solvent.

Since the composition of this embodiment includes the aluminum or the aluminum alloy, each of which is surface-treated by the surface treating agent of a fluorine-based compound, and also includes the polyoxyethylene alkyl ether phosphoric acid compound, when being ejected by an ink jet method, the composition described above is able to obtain an excellent ejection stability. The reason for this is believed as described below (however, the reason is not limited to that described below). When a metal powder containing aluminum or an aluminum alloy is included in a related solvent-based ink composition, due to stress generated by heating and/or pressure application performed at ejection of the above composition by an ink jet method, the metal powder aggregates by itself or reacts with impurities, such as water and/or oxygen, in an organic solvent, and hence, the ejection stability is degraded. In particular, the degradation described above seriously occurs when a solvent-based ink composition is ejected at a high frequency by a piezoelectric type ink jet method. In addition, even when the metal powder is surface-treated by a surface treating agent of a fluorine-based compound, due to the stress generated at the ejection of the composition by an ink jet method, since the surface treating agent is reversibly or irreversibly peeled away from the surface of the metal powder, and the aggregation of the metal powder itself and the reaction thereof with water and/or oxygen occur, an excellent ejection stability cannot be obtained. On the other hand, even when including the metal powder which contains aluminum or an aluminum alloy, each of which is surface-treated by the surface treating agent of a fluorine-based compound, since the solvent-based ink composition of this embodiment includes the polyoxyethylene alkyl ether phosphoric acid compound, it is believed that even under stress conditions caused by heating and/or pressure application performed at the ejection of the composition by an ink jet method, the surface treating agent is tightly maintained on the surface of the metal powder, and hence, the aggregation of the metal powder itself and the reaction thereof with water and/or oxygen are suppressed. Accordingly, the ejection stability of the composition is excellent. Furthermore, since the amount of the metal powder necessary to obtain a glossy property can be contained, the glossy property is also excellent.

Furthermore, by a related composition including a surface-treated metal powder, it is difficult to obtain the balance between the glossy property and the ejection stability. In particular, when the ink composition is ejected at a high frequency by an ink jet method, the number of ejection defects tends to be increased. For example, according to a metal powder surface-treated by a fluorine-containing phosphoric acid ester, since the surface free energy thereof is decreased, as compared to the state in which the metal powder is dispersed in the ink composition, the metal powder is more stabilized by a hydrophobic interaction in the state in which particles of the metal powder aggregate with a small distance therebetween. Hence, when a piezoelectric type ink jet method is used, by the conditions (such as high speed and high voltage conditions) in which a shear stress is strongly applied in a pressure chamber of an ink jet apparatus, the distances between the particles of the metal powder are each decreased, and as a result, soft aggregation occurs. It is inferred that since the soft aggregation occurs, the fluidity is degraded, the flow of the ink composition from the pressure chamber to the periphery of a nozzle becomes stagnant, and the supply of the ink composition is adversely influenced, so that the number of ejection defects is increased. On the other hand, since the composition of this embodiment includes the polyoxyethylene alkyl ether phosphoric acid compound, an effect to deaggregate the above soft aggregation is likely to be obtained. In particular, since the polyoxyethylene alkyl ether phosphoric acid compound is adsorbed/coordinated to the surface of the metal powder surface-treated by the fluorine-based surface treating agent, a molecular steric hindrance is newly introduced on the surface of the metal powder. As a result, the distances between the particles of the metal power are not excessively decreased, the interference between the metal particles is suppressed, the ejection stability at a high frequency is improved, and as a result, a glossy surface is formed by drying without causing the aggregation between the particles of the metal powder even during the coating film formation; hence, an excellent glossy property can be obtained which is equivalent or superior to that obtained when the fluorine-based surface treating agent is only used. In addition, in the composition of this embodiment, by the chemical structure (in particular, the polyoxyehtylene structure) of the polyoxyethylene alkyl ether phosphoric acid compound, the compatibility of the metal powder with a predetermined organic solvent is preferable as compared to that obtained by the chemical structure of the fluorine-based surface treating agent. In addition, similar to that described above, since the compatibility between the metal powder and an organic compound is also high, when an organic thin film layer of a colorant or a resin is provided on a glossy surface formed by the metal powder for protection and/or improvement in design property, wettability and spreadability of an ink are preferable, and the uniformity of the thickness of the coating film and the adhesion thereof are also improved.

The solvent-based composition of this embodiment includes at least a surface-treated metal powder and an organic solvent, each of which will be described later. A composition containing a solvent is roughly classified into two types, that is, a real-solvent (high organic solvent) composition and an eco-solvent (low organic solvent) composition. The eco-solvent composition has a low odor property, is a composition formed in consideration of human beings and environments, and uses an organic solvent which is not categorized in the organic solvent prescribed by Industrial Safety and Health Act, which is also not categorized in the first-class and the second-class organic solvents prescribed by Organic Solvent Poisoning Prevention Regulations, or which is other than that obliged to use a local exhaust ventilation at indoor workplaces in the installation environment prescribed by the Fire Service Act. The solvent-based composition of this embodiment preferably includes an organic solvent which is usable for the eco-solvent composition as described above.

The composition of this embodiment is preferably a non-aqueous system since being excellent in ejection stability. The "non-aqueous system" indicates that water is not substantially contained. In addition, a composition in which as a primary solvent component, water is not intentionally added in preparation thereof is more preferable, and a composition which inevitably contains water as an impurity may be included in the above composition. In view of the ejection stability, the content of water in the composition with respect to the total mass (100 percent by mass) of the composition is preferably 3.0 percent by mass or less, more preferably 2.0 percent by mass or less, and further preferably 1.0 percent by mass or less. The lower limit of the content of water is not particularly limited and may be the detection limit or less or may be 0.01 percent by mass. The content of water can be quantitatively determined by a known method.

As a method to adjust the content of water in the composition, for example, there may be mentioned a method in which water is removed from each component of the composition, in particular, a method in which water mixed in an organic solvent is removed, or a method in which water is removed from the composition; and a method in which during preparation of the composition, water is suppressed from being mixed therein. Among those methods, as the method in which water mixed in an organic solvent is removed, in more particular, there may be mentioned a method to refine the organic solvent by distillation, a method to allow the organic solvent to pass through a semi-permeable membrane which selectively allows water to pass, and a method to selectively adsorb water mixed in the organic solvent to a water adsorbent which adsorbs water. Among those methods, since the water content can be efficiency and reliably decreased, a method by distillation refining is preferable.

The composition of this embodiment is used for ink and can be used to be ejected by an ink jet method. Hereinafter, although the case in which the composition of this embodiment is used as an ink jet recording ink composition, which is one embodiment of the ink composition, will be described in detail, the composition of this embodiment is not limited thereto.

Dispersion Liquid

The composition of this embodiment is obtained, for example, by mixing a dispersion liquid containing a solvent (dispersion medium) and a surface-treated metal powder dispersed therein together with, if needed, an organic solvent. Although not particularly limited, the dispersion liquid is obtained as a liquid containing a surface-treated metal powder which is prepared in such a way that a metal powder functioning as mother particles in an organic solvent used as a solvent and a surface treating agent are mixed together at a predetermined temperature, so that the metal powder functioning as the mother particles are surface-treated by the surface treating agent. In addition, without being dispersed in a dispersion liquid, although the metal powder itself may be mixed with other raw materials to obtain the composition, the organic solvent is preferably used as a solvent. However, since the solvent can be removed by a known method after the surface-treated metal powder is obtained, the solvent is not particularly limited.

Surface-Treated Metal Powder

The surface-treated metal powder of this embodiment is a powder obtained by performing a surface treatment on a metal powder functioning as the mother particles (particles to be surface-treated by a surface treating agent) by a surface treating agent. The mother particles may be at least formed so that regions including the vicinities of the surfaces of the particles are each formed of aluminum or an aluminum alloy (hereinafter, referred to as "aluminum metal"), and for example, the mother particles each may be entirely formed of an aluminum metal or each may include a core portion formed of a non-metal material and a coating film formed of an aluminum metal covering the core portion. Since the aluminum metal is used, the ink composition has an excellent glossy property and also has an advantage in terms of raw material cost. In addition, the surface-treated metal powder may contain at least an aluminum metal and may further contain at least one another metal.

Although the aluminum alloy is not particularly limited as long as capable of showing a glossy property when the alloy is adhered to a medium such as a recording medium, for example, there may be mentioned an alloy formed of aluminum and at least one selected from the group consisting of silver, gold, platinum, nickel, chromium, tin, zinc, indium, titanium, and copper.

In addition, although the mother particles may be formed by any method, the mother particles are preferably formed in such a way that after a film is formed from an aluminum metal by a vapor phase film formation method, the film thus formed is pulverized. Accordingly, the glossy property is more excellent, and in addition, the variation in characteristics between the particles tends to be suppressed. In addition, since the above method is used as a manufacturing method of the mother particles, a relatively thin metal powder even tends to be preferably manufactured.

As long as each having a particle shape, the mother particles are not particularly limited and each may have any shape, such as a spherical shape, a spindle shape, a needle shape, or a flaky shape. Among the shapes mentioned above, the flaky shape is preferable. That is, the surface-treated metal powder particles each also preferably have a flaky shape. Since having a flaky shape, the surface-treated metal powder can be arranged on a recording medium to which the ink composition is adhered so that the primary surface of the particle is placed along a surface shape of the recording medium, an inherent glossy property of a metal material forming the surface-treated metal powder is likely to be obtained, and the abrasion resistance of a printed material tends to be further improved.

In this embodiment, the flaky shape indicates a shape, such as a flat shape or a curved plate shape, the area of which obtained when observed at a predetermined angle (when viewed in plan) is larger than the area thereof obtained when observed at an angle orthogonal to the above observation direction, and in particular, a ratio ($S_1/S_0$) of an area $S_1$ µm$^2$ obtained when observed along a direction along which the projected area is maximized (when viewed in plan) to an area $S_0$ µm$^2$ obtained when observed along a direction along which the area is maximized among directions orthogonal to the above observation direction is preferably 2.0 or more, more preferably 5.0 or more, and further preferably 8.0 or more. The ratio ($S_1/S_0$) can be obtained from the average particle diameter and the average thickness of the surface-treated metal powder which will be described below.

When the mother particles each have a flaky shape, the average thickness of the surface-treated metal powder is preferably 10 to 90 nm, more preferably 12 to 60 nm, and further preferably 14 to 35 nm. Accordingly, the advantage obtained since the mother particles each have a flaky shape can be more significantly obtained.

The average thickness of the surface-treated metal powder is measured by the following method.

First, several liquid droplets of a surface-treated metal pigment diluted by 10 times or more using acetone are dripped on a flat glass substrate and are then spontaneously dried for 2 hours or more.

Subsequently, by the use of an atomic force microscope (manufactured by Seiko Instruments Inc.: "SPA400"), 30 points of an aluminum pigment forcedly arranged on this glass substrate are extracted, and the thicknesses thereof are each measured by a tapping mode.

Among the thicknesses of the 30 points thus measured, after the thicknesses of three points ranked as the top and the thicknesses of three points ranked as the bottom are excluded, the average value is obtained from the remaining 24 points, and this average value is regarded as the average thickness.

The average particle diameter of the surface-treated metal powder is preferably 0.2 to 1.0 µm, more preferably 0.3 to 0.7 µm, and further preferably 0.4 to 0.6 µm. Since the average particle diameter is 1.0 µm or less, the glossy property of a recorded material manufactured by using the ink composition tends to be further improved. In addition, the ejection stability of the composition tends to be further improved. On the other hand, since the average particle diameter is 0.2 µm or more, the glossy property of a recorded material tends to be easily obtained. In addition, the average particle diameter is obtained on a volume basis.

The average particle diameter of the surface-treated metal powder was obtained in such a way that as a measurement device, a Microtrac MT-3000 (manufactured by Nikkiso Co., Ltd.) was used, a solution in which the surface-treated metal powder was diluted with diethylene glycol diethyl ether at an optimum factor was circulated in a device flow path, and the average value was calculated from four measurement results.

The maximum particle diameter of the surface-treated metal powder is preferably 5.0 µm or less, more preferably 4.5 µm or less, and further preferably 4.0 µm or less. Accordingly, the ejection stability of the composition tends to be further improved. In addition, the lower limit of the maximum particle diameter of the metal powder is not particularly limited and may be, for example, set to 1.0 µm.

In addition, in order to set the average thickness, the average particle diameter, and the maximum particle diameter of the surface-treated metal powder in the respective ranges described above, mother particles having an average thickness, an average particle diameter, and a maximum particle diameter, which are in ranges similar to the above respective ranges, may be used.

The content of the mother particles in the dispersion liquid with respect to the mass (100 percent by mass) of the solvent in the dispersion liquid is preferably 0.5 to 100 percent by mass, more preferably 1.5 to 50 percent by mass, and further preferably 3.0 to 10 percent by mass. Since the content of the mother particles is set in the range as described above, the dispersibility of the mother particles can be further improved, and in addition, the surface-treated metal powder contained in an ink composition which is finally obtained can be more easily controlled to have a desired content or more.

The content of the surface-treated metal powder in the composition is preferably 0.2 to 40 percent by mass, more preferably 0.5 to 10.0 percent by mass, and further preferably 1.2 to 3.0 percent by mass. Since the content of the surface-treated metal powder is set in the range as described above, the glossy property of a recorded material and the ejection stability of the composition can be further improved with good balance.

Solvent (Dispersion Medium)

The solvent (dispersion medium) in the dispersion liquid is not particularly limited as long as the surface-treated metal powder can be dispersed. In order to further improve the dispersion of the surface-treated metal powder, as the solvent (dispersion medium), the organic solvents contained in the composition described below by way of example are preferable, and among those solvents, preferable organic solvents contained in the composition are also preferable. An organic solvent to be contained in the composition may be the same as or different from the organic solvent to be contained in the dispersion liquid.

Surface Treating Agent

Next, the fluorine-based compound to be used for the surface treatment of the mother particles will be described.

As described above, the metal powder included in the solvent-based ink composition of this embodiment is formed by performing a surface treatment on the mother particles with a fluorine-based compound. As the fluorine-based compound as described above, for example, a fluorine-based phosphonic acid, a fluorine-based carboxylic acid, a fluorine-based sulfonic acid, a fluorine-based silane, or salts thereof may be preferably used. When those fluorine-based compounds are used, for example, a phosphonic acid group, a carboxyl group, or a sulfonic acid group is bonded to the surfaces of the mother particles to form coating films, and hence, a base metal pigment having a water resistance can be obtained. Accordingly, the base metal pigment is effectively suppressed from reacting with water in an aqueous medium, and a base metal pigment dispersion liquid also excellent in dispersibility can be obtained. Among those mentioned above, since a phosphonic acid group has a particularly excellent bonding ability to the surfaces of the mother particles, the fluorine-based phosphonic acid and its salt are more preferable.

As the phosphonic acid group and its salt, a composition having the structure represented by the following general formula (1) is preferable.

Chem. 1

(1)

In the above formula (1), $R^1$ each independently represents one group selected from $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$—, and $CF_3(CF_2)_m(CH_2)_lO$—, and M each independently represents a hydrogen atom, a monovalent metal ion, an ammonium ion, or $N(-R^2)(-R^3)(-R^4)$. $R^2$, $R^3$, and $R^4$ each represent a hydrogen atom or a $C_2H_4OH$ group, but the case in which $R^2$, $R^3$, and $R^4$ each represent a hydrogen atom is excluded. n indicates an integer of 1 to 3, m indicates an integer of 1 to 12, and l(el) indicates an integer of 1 to 12.

In the above formula (1), although m indicates an integer of 1 to 12, m preferably indicates an integer of 1 to 8 and more preferably indicates an integer of 1 to 5. In addition, although l(el) indicates an integer of 1 to 12, l(el) preferably indicates an integer of 1 to 10 and more preferably indicates an integer of 1 to 6. When m and l(el) are each in the above preferable range, the advantage as described above can be more significantly obtained.

As the above fluorine-based phosphonic acid, since the adsorption ability to the surfaces of the mother particles and the improvement in water resistance are excellent in terms of the balance therebetween, a compound represented by the following general formula (2) is particularly preferable.

Chem. 2

(2)

In the above formula (2), although m indicates an integer of 1 to 12, m preferably indicates an integer of 1 to 8 and more preferably indicates an integer of 1 to 5. In addition, although l(el) indicates an integer of 1 to 12, l(el) preferably indicates an integer of 1 to 10 and more preferably indicates an integer of 1 to 6. When m and l(el) are in the preferable respective ranges described above, the advantage as described above can be more significantly obtained.

As the fluorine-based carboxylic acid and its salt, a compound having the structure represented by the following general formula (3) is preferable.

Chem. 3

(3)

In the above formula (3), $R^5$ represents one group selected from $CF_3(CF_2)_m$—, $CF_3(CF_2)_m(CH_2)_l$—, and $CF_3(CF_2)_mO(CH_2)_l$—, and M represents a hydrogen atom, a monovalent metal ion, or an ammonium ion. Although m indicates an integer of 1 to 12, m preferably indicates an integer of 1 to 8, and more preferably indicates an integer of 1 to 5. In addition, although l(el) indicates an integer of 1 to 12, l(el) preferably indicates an integer of 1 to 10 and more preferably indicates an integer of 1 to 6.

As the fluorine-based sulfonic acid and its salt, a compound having the structure represented by the following general formula (4) is preferable.

Chem. 4

(4)

In the above formula (4), $R^6$ represents one group selected from $CF_3(CF_2)_m$—, $CF_3(CF_2)_m(CH_2)_l$—, and $CF_3(CF_2)_mO(CH_2)_l$—, and M represents a hydrogen atom, a monovalent metal ion, or an ammonium ion. m indicates an integer of 5 to 17, and l (el) indicates an integer of 1 to 12.

In addition, the fluorine-based compound preferably has at least a perfluoroalkyl group ($C_nF_{2n+1}$—) as a part of its structure, and the number of carbon atoms of the perfluoroalkyl group is more preferably 1 to 6. Since the fluorine-based compound has the structure as described above, the water resistance is further improved, and a base metal pigment excellent in metal glossy property and dispersibility is likely to be obtained.

In addition, the molecular weight of the fluorine-based compound is preferably 1,000 or less. When the fluorine-based compound to be adsorbed to the surfaces of the mother particles is, for example, a fluorine-based polymer disclosed in Japanese Unexamined Patent Application Publication No. 2003-213157, Japanese Unexamined Patent Application Publication No. 2006-169393, or Japanese Unexamined Patent Application Publication No. 2009-215411, since the thickness of the coating film is excessively increased, the metal glossy property is degraded, and in addition, since the interaction between particles of the base metal pigment forming the coating film is increased, the dispersibility may be seriously degraded in some cases. Hence, the film to be formed on the surface of each of the mother particles is preferably a monomolecular film formed from a fluorine-based compound having a molecular weight of 1,000 or less.

The content of the surface treating agent in the dispersion liquid with respect to the mass (100 percent by mass) of the mother particles is preferably 0.5 to less than 20 percent by mass, more preferably 1.5 to less than 10 percent by mass, and further preferably 3.0 to 8.0 percent by mass. Since the content described above is 0.5 percent by mass or more, the ejection stability tends to be further improved, and since the content described above is 3.0 percent by mass or more, the ejection stability tends to be even further improved. In addition, since this content is less than 20 percent by mass, the ejection stability tends to be further improved, and since the content described above is less than 8.0 percent by mass, the ejection stability tends to be even further improved.

Polyoxyethylene Alkyl Ether Phosphoric Acid Compound

The solvent-based ink composition of this embodiment includes a polyoxyethylene alkyl ether phosphoric acid compound, and this polyoxyethylene alkyl ether phosphoric acid compound is preferably a compound represented by the following formula (5), an ester compound thereof, or a salt thereof.

$$[RO(CH_2CH_2O)_n]_m PO(OH)_{3-m} \quad (5)$$

(In the formula, R represents an alkyl group, n indicates an integer of 1 or more, and m indicates an integer of 1 to 3.)

R in the formula (5) represents an alkyl group, and the alkyl group may be partially substituted. The number of carbon atoms of the alkyl group is not particularly limited and is preferably 4 to 18. As a concrete alkyl group, for example, there may be mentioned a butyl group, a pentyl group, a hexyl group, a heptyl group, an octyl group, a nonyl group, a decyl group, an undecyl group, a dodecyl group (lauryl group), and a tridecyl group, and a tridecyl group is preferable. In addition, the alkyl group may also be a styrenated phenyl group.

In the formula (5), n indicates an integer of 1 or more, preferably indicates an integer of 1 to 25, even more preferably indicates 2 to 24, and further preferably indicates an integer of 5 to 23.

In the formula (5), m indicates an integer of 1 to 3.

Although a commercially available product of the polyoxyethylene alkyl ether phosphoric acid compound is not particularly limited, for example, there may be mentioned PLYSURF A212C, A215C, A208F, M208F, A208N, A208B, A219B, DB-01, A210D, AL, and AL12H (trade name, manufactured by DKS Co., Ltd.); DISPER BYK102 and BYK180 (trade name, manufactured by BYK Japan KK); and NIKKOL DLP-10, DOP-8NV, DDP-2, DDP-4, DDP-6, DDP-8, and DDP-10 (trade name, manufactured by Nikko Chemicals Co., Ltd.). Among those mentioned above, PLYSURF A212C, M208F, A209B, and A215C and DISPER BYK102 are preferable.

Although the polyoxyethylene alkyl ether phosphoric acid compound is not particularly limited as long as having a structure derived from a polyoxyethylene alkyl ether phosphoric acid, for example, there may be mentioned a polyoxyethylene alkyl ether phosphoric acid, an ester compound thereof, and a salt thereof.

The content of the polyoxyethylene alkyl ether phosphoric acid compound with respect to the total mass (100 percent by mass) of an ink is 0.1% to 10.0%, preferably 0.2% to 5.0%, and more preferably 0.3% to 3%.

As the conditions under which the metal powder functioning as the mother particles is surface-treated by the surface treating agent, for example, the temperature and the time may be mentioned. The temperature of the surface treatment is preferably 20° C. to 100° C., more preferably 30° C. to 80° C., and further preferably 40° C. to 60° C. The time of the surface treatment is preferably 1.0 minute to one week, more preferably 1.0 hour to three days, and further preferably 10 hours to 1.5 days. Accordingly, the ejection stability of the ink composition tends to be further improved.

In addition, another surface treating agent other than the fluorine-based compound may also be used together therewith. In the case as described above, a surface treatment using a plurality of surface treating agents may be performed on the same mother particles, and the surface-treated metal powder may contain a plurality of types of particles surface-treated by different surface treating agents. The another surface treating agent is not particularly limited, and for example, a fluorine-based, an aliphatic acid-based, an oil and fat-based, a surfactant-based, a wax-based, a carboxylic acid-based, a phosphoric acid-based, a coupling agent, and a high molecular weight material-based known surface treating agent may be widely used.

The mother particles surface-treated by the surface treating agent as described above are preferably brought into contact with an acid or a base in advance. Accordingly, the modification by chemical bonds can be more reliably performed on the surfaces of the mother particles by the surface treating agent, and the advantage of the present invention as described above tends to be more effectively obtained. Although the acid is not particularly limited, for example, there may be mentioned a protonic acid, such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, or hypophosphorous acid. Among those acids mentioned above, at least one selected from the group consisting of hydrochloric acid, phosphoric acid, and acetic acid is preferable. In addition, although the base is not particularly limited, for example, there may be mentioned sodium hydroxide, potassium hydroxide, and calcium hydroxide may be mentioned. Among those bases mentioned above, at least one selected from the group consisting of sodium hydroxide and potassium hydroxide is preferable. When a plurality of types of surface treatments is performed on the same particles, the surface treatment may be performed by a plurality of steps using the respective surface treating agents or may be performed in the same step using the plurality of types of surface treating agents.

Organic Solvent

Although the organic solvent included in the composition of this embodiment is not particularly limited, for example, a glycol monoether, a glycol diether, a lactone, and an aprotic polar solvent may be mentioned, and those solvents may be used alone, or at least two types thereof may be used in combination.

Although the glycol monoether is not particularly limited, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether may be mentioned.

Among those mentioned above, diethylene glycol monomethyl ether, dipropylene glycol monomethyl ether, triethylene glycol monobutyl ether, tripropylene glycol monomethyl ether, and tetraethylene glycol monobutyl ether may be mentioned and are preferable. Since the glycol monoether is contained, a shielding property of an obtained recorded material tends to be further improved. The glycol monoethers may be used alone, or at least two types thereof may be used in combination.

Although the glycol diether is not particularly limited, for example, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether may be mentioned. Among those mentioned above, diethylene glycol methyl ethyl ether and diethylene glycol diethyl ether are preferable. Since the glycol diether as described above is contained, the balance between the ejection stability and the shielding property of an obtained recorded material tends to be further improved. The glycol diethers may be used alone, or at least two types thereof may be used in combination.

Although being not particularly limited, for example, the lactone is a compound having a ring structure by an ester bond, and there may be mentioned a γ-lactone having a five membered ring structure, a δ-lactone having a six membered ring structure, and a ε-lactone having a seven membered ring structure. In more particular, there may be mentioned γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactone. Among those mentioned above, a γ-lactone having a five membered ring structure is preferable, and γ-butyrolactone and γ-valerolactone are more preferable. Since the lactone as described above is contained, the abrasion resistance tends to be further improved. The lactones may be used alone, or at least two types thereof may be used in combination.

Although the aprotic polar solvent is not particularly limited, for example, a cyclic ketone compound, a chain ketone compound, and a chain nitrogen compound may be mentioned. In addition, as a cyclic nitrogen compound and the aprotic compound, a pyrrolidone-based, an imidazolidinone-based, a sulfoxide-based, a lactone-based, and an amide ether-based solvent may be mentioned as a typical example. In particular, 2-pyrrolidone, an N-alkyl-2-pyrrolidone, a 1-alkyl-2-pyrrolidone, γ-butyrolactone, 1,3-dimethyl-2-imidazolidinone, dimethyl sulfoxide, imidazole, 1-methylimidazole, 2-methylimidazole, and 1,2-dimethylimidazole are preferable.

The content of the organic solvent with respect to the total mass (100 percent by mass) of the composition is preferably 35 to 99.5 percent by mass, more preferably 45 to 99.0 percent by mass, and further preferably 60 to 98.5 percent by mass. In addition, the content of the organic solvent in the composition is the content also including the organic solvent used for the dispersion liquid.

Other Components

The composition of this embodiment may include, besides the components described above, at least one arbitrary component usable for a related ink jet ink composition. As the arbitrary components as described above, in particular, for example, there may be mentioned a colorant such as a dye, a surfactant, a penetrating agent, a moisture-retaining agent, a solubilizing agent, a viscosity adjustor, a pH adjustor, an antioxidant, an antiseptic agent, a fungicide, a corrosion inhibitor, a chelating agent trapping metal ions which adversely influence the dispersion, and other additives and solvents. Those components mentioned above may be used alone, or at least two types thereof may be used in combination.

Ink Jet Recording Apparatus

Figure 1:
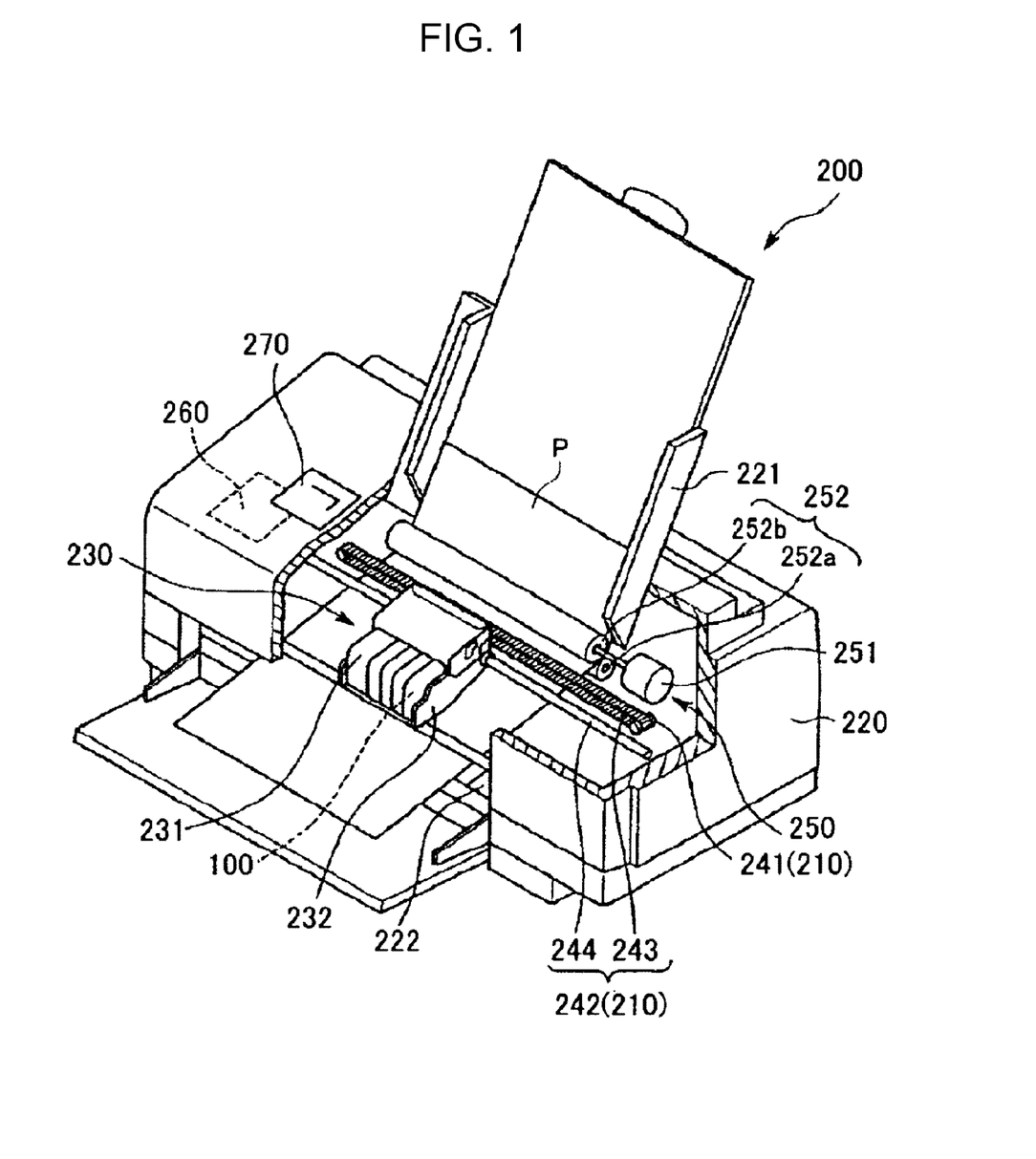
FIG. 1 is a perspective view schematically showing an ink jet recording apparatus usable in an embodiment.

An ink jet recording apparatus usable in this embodiment includes an ejection head ejecting an ink composition. Hereinafter, although the ink jet recording apparatus usable in this embodiment will be described by way of example using an ink jet recording apparatus 200 shown in FIG. 1, the ink jet recording apparatus of this embodiment is not limited to the modes, such as the shape and the composition, of the ink jet recording apparatus 200 and may have an appropriate composition. FIG. 1 is a perspective view schematically showing the ink jet recording apparatus 200 usable in this embodiment.

The ink jet recording apparatus 200 includes a head unit 230, a drive portion 210, and a control portion 260. In addition, the ink jet recording apparatus 200 also includes an apparatus main body 220, a paper supply portion 250, a tray 221 in which recording paper P is placed, a paper discharge port 222 discharging the recording paper P, and an operation panel 270 disposed on an upper surface of the apparatus main body 220.

The head unit 230 includes an ink jet type recording head (hereinafter, simply referred to as "head" or "ejection head" in some cases) formed of an ejection head 100 which will be described later. The head unit 230 further includes an ink cartridge 231 which supplies an ink composition to the head and a transport portion (carriage) 232 which mounts the head and the ink cartridge 231.

The drive portion 210 enables the head unit 230 to reciprocally move. The drive portion 210 includes a carriage motor 241 functioning as a drive source of the head unit 230 and a reciprocating motion mechanism 242 which enables the head unit 230 to reciprocally move in response to the rotation of the carriage motor 241.

The reciprocating motion mechanism 242 includes a carriage guide shaft 244 supported at two ends thereof by a frame (not shown) and a timing belt 243 extending in parallel to the carriage guide shaft 244. The carriage guide shaft 244 supports the carriage 232 so that the carriage 232 is able to freely reciprocally move. Furthermore, the carriage 232 is fixed to a part of the timing belt 243. By the operation of the carriage motor 241, when the timing belt 243 moves, the head unit 230 reciprocally moves along the carriage guide shaft 244. During this reciprocal movement, the ink composition is ejected from the head at a predetermined timing, so that printing is performed on the recording paper P.

In this embodiment, although an example in which printing is performed while both the ejection head 100 and the recording paper P are moved is shown, the ink jet recording apparatus may have a mechanism in which printing is performed on the recording paper P while the position of the ejection head 100 and the position of the recording paper P are relatively changed. In addition, in this embodiment, although an example in which printing is performed on the recording paper P is shown, a recording medium on which printing can be performed by the ink jet recording apparatus of this embodiment is not limited to paper, and various types of media, such as a cloth, a film, and a metal, may be mentioned, so that the composition may be appropriately changed.

The control portion 260 is able to control the head unit 230, the drive portion 210, and the paper supply portion 250. The paper supply portion 250 is able to feed the recording paper P from the tray 221 to a head unit 230 side. The paper supply portion 250 includes a paper supply motor 251 functioning as a drive source thereof and a paper supply roller 252 to be rotated by the operation of the paper supply motor 251. The paper supply roller 252 includes a driven roller 252a and a drive roller 252b facing each other with a feeding path of the recording paper P provided therebetween. The drive roller 252b is connected to the paper supply motor 251. When the paper supply portion 250 is driven by the control portion 260, the recording paper P is fed so as to pass under the head unit 230. The head unit 230, the drive portion 210, the control portion 260, and the paper supply portion 250 are provided in the apparatus main body 220.

In addition, although the ink jet recording apparatus 200 shown by way of example has one ejection head, and by this ejection head, printing can be performed on a recording medium, the ink jet recording apparatus 200 may has a plurality of ejection heads. When the ink jet recording apparatus has a plurality of ejection heads, the ejection heads may be independently operated as described above or may be connected to each other so as to function as one assembled head. As the assembled head as described above, in particular, for example, there may be mentioned a line-type head in which nozzle holes of the respective heads are disposed with regular intervals as a whole.

Ejection Head

Figure 2:
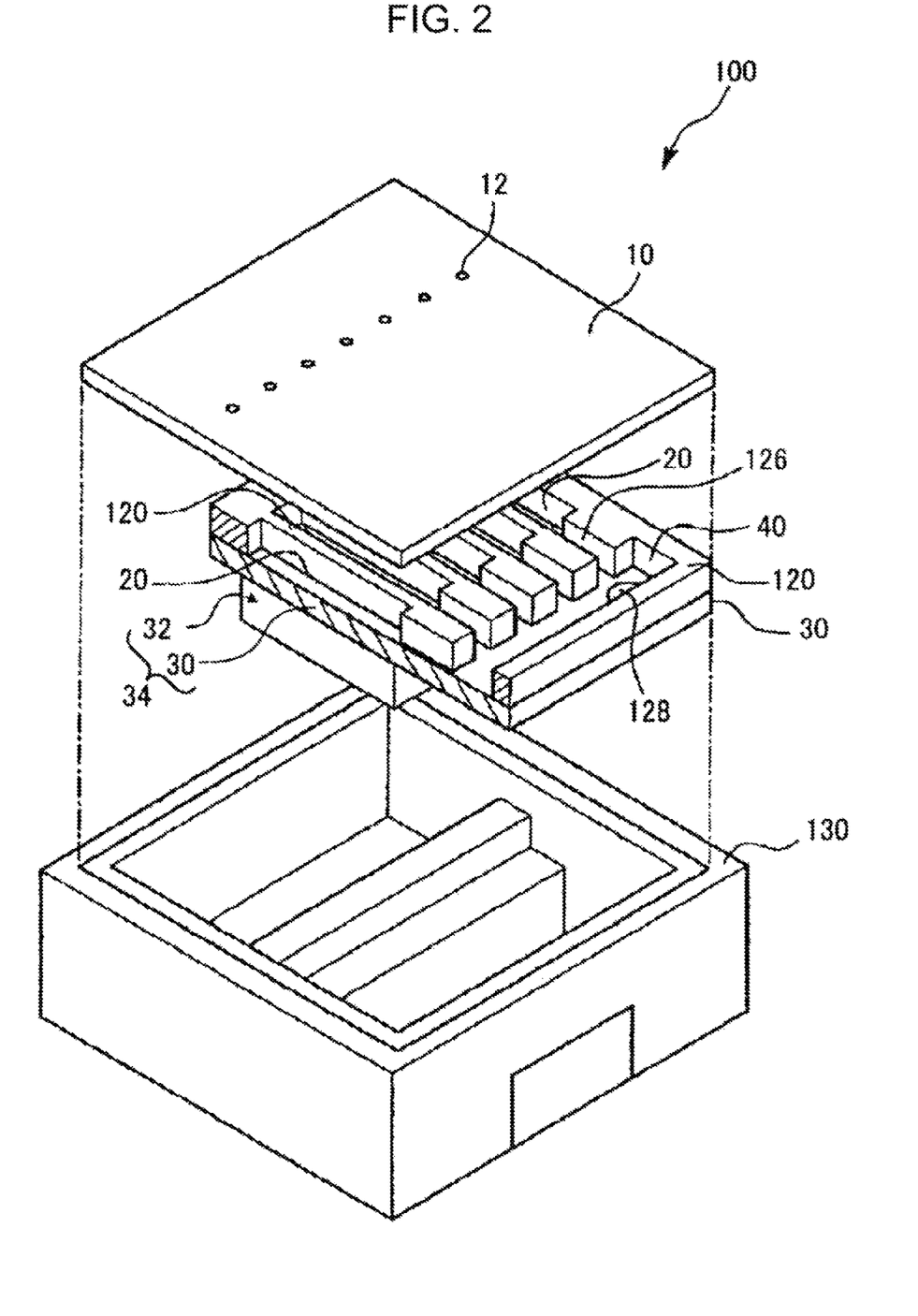
FIG. 2 is an exploded perspective view schematically showing an ejection head according to this embodiment.

The ejection head of this embodiment includes a nozzle plate having at least one nozzle hole and a vibration plate and also includes a pressure chamber, the volume of which is changed by the vibration plate, a flow path communicating with the pressure chamber and the nozzle hole, and an ink supply chamber supplying an ink composition to the pressure chamber. Hereinafter, although the ejection head of this embodiment will be described by way of example using ejection heads 100 and 101 shown in FIGS. 2 and 3, the ejection head of this embodiment is not limited to the modes, such as the shape and the structure, of the ejection heads 100 and 101 and may have an appropriate composition. FIG. 2 is an exploded perspective view schematically showing the ejection head of this embodiment.

The ejection head 100 shown in FIG. 2 is shown upside down as compared to the state in which the head is mounted in the ink jet recording apparatus 200 shown in FIG. 1. The ejection head 100 shown in FIG. 2 includes a plurality of pressure chambers 20 which communicate with respective nozzle holes 12 formed in a nozzle plate 10, a vibration plate 30 which changes the volume of each of the pressure chambers 20, and an ink supply chamber 40 which supplies an ink composition to the pressure chambers 20.

In addition, the ejection head 100 includes a piezoelectric element 32, and the piezoelectric element 32 is formed in direct contact with the vibration plate 30. In addition, a piezoelectric actuator 34 is formed from the piezoelectric element 32 and the vibration plate 30. In addition, for the convenience of illustration of the drawing, the scale reduction of each constituent element is appropriately changed. In addition, in FIG. 2, the piezoelectric element 32 is simplistically shown.

Furthermore, the ejection head 100 includes the nozzle plate 10 in which the nozzle holes 12 are formed, a pressure chamber substrate 120 forming the pressure chambers 20, and the piezoelectric element 32. In addition, the ejection head 100 may include a housing 130.

In the nozzle plate 10, the nozzle holes 12 are formed. The nozzle holes 12 can eject the ink composition. In the nozzle plate 10, a plurality of nozzle holes 12 is arranged and provided. As a material of the nozzle plate 10, in particular, silicon and stainless steel (SUS) may be mentioned. In addition, as a material of the nozzle plate 10, when an alloy containing iron (Fe) as a primary component (50 percent by mass or more) and 10.5 percent by mass or more of chromium (Cr) is used, it is preferable since the rigidity and an antirust property can be simultaneously obtained.

Although the hole diameter of the nozzle hole 12 is not particularly limited as long as the ink composition can be ejected, the hole diameter is preferably 5.0 to 30 μm, more preferably 10 to 25 μm, and further preferably 10 to 20 μm. Since the hole diameter is 5.0 μm or more, the amount of a liquid droplet to be ejected tends to be easily significantly decreased, and since the hole diameter is 30 μm or less, the ejection tends to be continuously and stably performed from nozzles arranged at a high density of 200 dpi or more. For the plurality of nozzle holes 12, the average value is used as the hole diameter.

In addition, as the shape of the nozzle hole 12, in particular, although a round shape, an oval shape, and a rectangular shape may be mentioned, the round shape is preferable in view of the machining accuracy and the shape of an ejected liquid droplet.

In the ejection head 100, the pressure chamber substrate 120 is provided in direct contact with the nozzle plate 10. As a material of the pressure chamber substrate 120, in particular, silicon may be mentioned, but the material is not limited thereto. Since the pressure chamber substrate 120 defines the space between the nozzle plate 10 and the vibration plate 30, the ink supply chamber 40 (liquid storage portion), supply ports 126 each communicating with the ink supply chamber 40, and the pressure chambers 20 communicating with the respective supply ports 126 are formed.

In this example, although the ink supply chamber 40, the supply port 126, and the pressure chamber 20 will be separately explained, those elements each function as a liquid flow path, and the flow paths may be arbitrarily designed as long as the pressure chamber 20 can be formed. In addition, for example, as the supply port 126 shown in FIG. 2, although the shape in which the flow path is partially narrowed is formed, the expansion and the contraction of the flow path as described above can be arbitrarily formed in accordance with the design.

In addition, the pressure chamber 20 of the ejection head 100 indicates the space defined by the nozzle plate 10, the pressure chamber substrate 120, and the vibration plate 30 and at least indicates the space not including the nozzle hole 12 and the supply port 126. That is, the pressure chamber 20 is the space, the volume of which is changed by the deformation of the vibration plate 30, and is the space not including the narrowed flow path communicating with this space and the like.

The ink supply chamber 40, the supply ports 126, and the pressure chambers 20 are defined by the nozzle plate 10, the pressure chamber substrate 120, and the vibration plate 30. The ink supply chamber 40 can temporarily store the ink composition supplied from the outside (such as an ink cartridge) through a penetrating hole 128 provided in the vibration plate 30. The ink composition in the ink supply chamber 40 can be supplied to the pressure chamber 20 through the supply port 126. The volume of the pressure chamber 20 is changed by the deformation of the vibration plate 30. The pressure chamber 20 communicates with the nozzle hole 12, and when the volume of the pressure chamber 20 is changed, the ink composition can be ejected from the nozzle hole 12, or the ink composition can be introduced from the ink supply chamber 40 into the pressure chamber 20.

In the ejection head 100, the vibration plate 30 is provided in contact with the pressure chamber substrate 120. Since the vibration plate 30 is deformed by the operation of the piezoelectric element 32 so as to change the volume of the pressure chamber 20, the internal pressure of the pressure chamber 20 can be changed. In addition, in this example, although the pressure chamber 20 is defined by the nozzle plate 10, the pressure chamber substrate 120, and the vibration plate 30, as long as the volume of the pressure chamber 20 can be changed by the vibration of the vibration plate 30, the pressure chamber 20 may be formed from at least one arbitrary member, and for example, the number, the shape, and the material of the members may be arbitrarily determined.

In the ejection head 100, the piezoelectric element 32 is provided in direct contact with the vibration plate 30. The piezoelectric element 32 is electrically connected to a piezoelectric element drive circuit (not shown) and can operate (vibrate or deform) in accordance with a signal of the piezoelectric element drive circuit. As the piezoelectric element 32, in particular, for example, an element (electromechanical transduction element) capable of generating the deformation by voltage application may be mentioned. In this embodiment, a portion of the vibration plate 30 defining the pressure chamber 20 and the piezoelectric element 32 provided at the portion described above are collectively called the piezoelectric actuator 34 in some cases. In addition, the vibration plate 30 may be integrally formed with electrodes (for example, formed from Pt or the like) forming the piezoelectric element 32.

In the ejection head 100, since the distance between the nozzle holes 12 can be set to a predetermined length or less, as the piezoelectric element 32, the structure in which a piezoelectric material is disposed between two electrodes is preferable. That is, as the piezoelectric actuator 34, in particular, a thin film structure is preferably formed as a whole on the vibration plate 30 so that one electrode, one layer of a piezoelectric material (such as PZT (lead zirconate titanate)), and another electrode are sequentially laminated.

As a material of the vibration plate 30, in particular, for example, there may be mentioned silicon oxide ($SiO_2$), silicon nitride (SiN), silicon oxynitride (SiON), zirconium oxide ($ZrO_2$), titanium oxide ($TiO_2$), and silicon carbide (SiC), and a laminate of layers formed of the materials mentioned above. As the material of the vibration plate 30, a material having a Young's modulus of 250 GPa or less is more preferable since the deformation can be increased, and damage is not likely to occur, and in particular, the vibration plate 30 is preferably formed to contain at least one of $ZrO_2$ (150 GPa), $SiO_2$ (75 GPa), Si (130 GPa), SUS (199 GPa), and Cr (248 GPa) (value in the parenthesis indicates Young's modulus). In addition, in the case in which the electrode of the piezoelectric element 32 is formed of Pt and is integrally laminated with the vibration plate 30, since Young's modulus of Pt is 168 GPa, Young's modulus of $ZrO_2$ is 150 GPa, and even when those compounds are used in combination, Young's modulus thereof is 250 GPa or less, the composition as described above may also be formed.

In addition, in this embodiment, Young's modulus indicates a Young's modulus measured by a static test (JIS G0567J or the like, mechanical test) and, in particular, is measured using a 11-6 test piece.

The housing 130 can receive the nozzle plate 10, the pressure chamber substrate 120, and the piezoelectric element 32. As a material of the housing 130, in particular, a resin, a metal, and the like may be mentioned. The housing 130 may have a function to separate the piezoelectric element 32 from an outside environment. In addition, for example, an inert gas may be sealed in the housing 130, or the pressure of the inside of the housing 130 may be reduced, so that the piezoelectric material is suppressed from being degraded and the like. In addition, although the housing 130 functions as a cover covering the piezoelectric element 32, a cover not shown may also be provided besides the housing 130, and in this case, the housing 130 may function as a support member of the ejection head 100.

Figure 3:
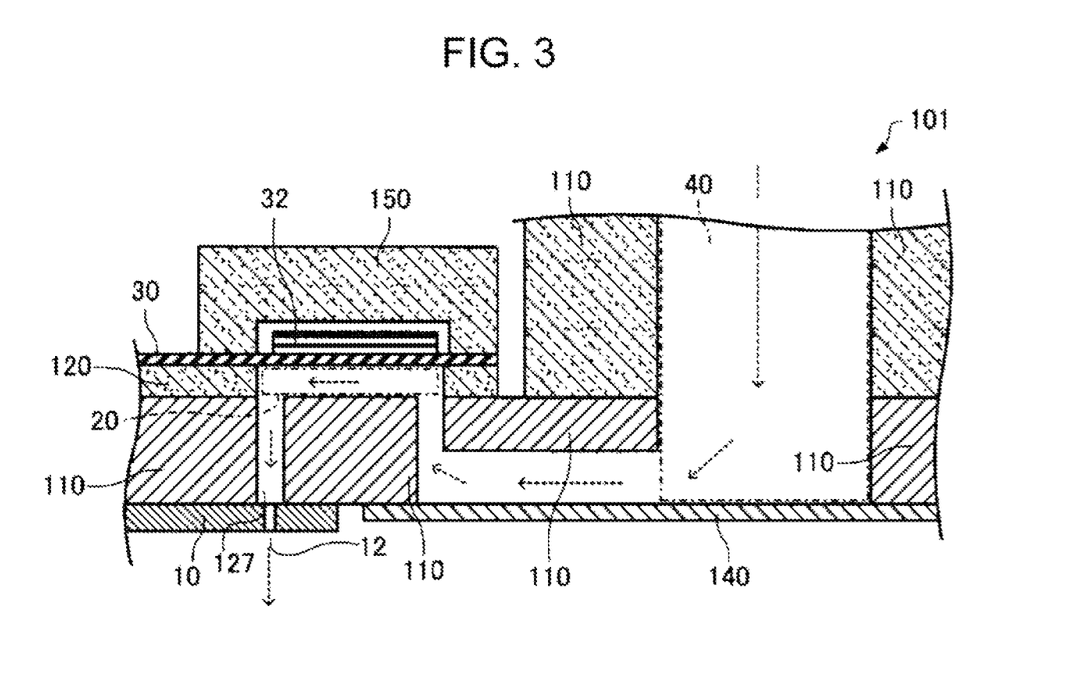
FIG. 3 is cross-sectional view schematically showing an important portion of an ejection head according to this embodiment.

FIG. 3 is a cross-sectional view schematically showing an important portion of an ejection head of this embodiment. FIG. 3 is a cross-sectional view schematically showing an important portion of an ejection head 101. For illustration of the ejection head 101, a member having a function similar to that of the member of the above ejection head 100 is designated by a similar reference numeral, and detailed description is omitted.

In the ejection head 101 shown in FIG. 3, a pressure chamber 20 communicating with a nozzle hole 12 formed in a nozzle plate 10 is formed, a vibration plate 30 which changes the volume of the pressure chamber 20 is included, and an ink supply chamber 40 supplying an ink composition to the pressure chamber 20 is formed. In FIG. 3, the flow of the ink composition from the ink supply chamber 40 to the nozzle hole 12 at the ejection operation of the ink composition is schematically shown by dotted arrow lines.

In the ejection head 101 shown in FIG. 3, a flow path 127 is formed. The pressure chamber 20 indicates the space defined by a flow path forming substrate 110, a pressure chamber substrate 120, and the vibration plate 30. That is, the pressure chamber 20 indicates the space in which the volume is changed by the deformation of the vibration plate 30, and this space does not include the nozzle hole 12 and the flow path 127.

In order to obtain more preferable ejection stability and resolution of printing, although the ejection head 101 of this embodiment is not particularly limited, the volume of the pressure chamber 20 is preferably $10.0 \times 10^6$ μm or less, and the density of the arrangement of the nozzle holes 12 is preferably 200 dpi or more. In addition, from the same point as described above, the head frequency is preferably 8 to 100 kHz, more preferably 10 to 60 kHz, and further preferably 20 to 40 kHz.

In order to set the volume of the pressure chamber 20 to the above range, for example, the distance between the flow path forming substrate 110 and the vibration plate 30, each of which defines the pressure chamber 20, may be appropriately set to form the ejection head 101. In addition, by the flow path forming substrate 110 defining the pressure chamber 20, the flow path 127 communicating between the pressure chamber 20 and the nozzle hole 12 is formed.

Although leading to the nozzle hole 12, the pressure chamber 20 does not communicate therewith but leads to the nozzle hole 12 through the flow path 127 provided therebetween. In this case, compared to the case in which the pressure chamber 20 and the nozzle hole 12 communicate with each other, the amount of the ink composition to be ejected can be precisely controlled. In addition, since the flow of the ink composition is aligned in an ejection direction of the ink composition by the flow path 127, an ejection property tends to be further improved.

However, in the case of the ejection head 101 having the structure as described above, when the ink composition contains a self-dispersion type pigment and/or a polymer dispersion type pigment, a stable continuous printing property is not likely to be obtained. The reason for this is believed that after the vibration plate 30 is deformed, the dispersibility of the pigment described above is suppressed in the flow path 127. In addition, however, when the nitrogen content in the ink composition is set in a specific range, a stable continuous printing property can be obtained.

The flow path 127 communicates with the nozzle hole 12 and the pressure chamber 20, the flow direction of the ink from a flow path 20 to a flow path 120 is not straight, and the flow direction of the ink composition is changed. In FIG. 3, although the flow direction of the ink composition in the flow path 127 is changed by 90° with respect to the flow direction of the ink composition in the pressure chamber 20, as long as the flow direction is changed, the angle thereof is not particularly limited. In addition, the flow direction of the ink composition preferably coincides with the gravity direction in view of stable continuous printing property. At the point of change in flow direction as described above, since a flow rate distribution of the ink is generated, bubbles in the ink are liable to be stagnant at a low flow rate portion, and as a result, discharge failure may be generated in some cases. This phenomenon is liable to occur when the ink composition contains a self-dispersion type pigment and/or a polymer dispersion type pigment, and the reason for this is believed that since many minute bubbles adsorbed to the voids formed between the pigment particles gather together at the low flow rate portion, the bubbles aggregate and grow largely, so that discharge failure may occur in some cases.

Although the shape of the flow path 127 is not particularly limited as long as the flow path 127 communicates with the nozzle hole 12 and the pressure chamber 20, in particular, a face orthogonal to the flow direction of the ink composition may have a square shape, a rectangular shape, or a round shape, and in view of head manufacturing, the square shape is preferable. In addition, the area of the above orthogonal face is preferably $1.0 \times 10^{-4}$ to $1.0 \times 10^{-7}$ μm², more preferably $1.0 \times 10^{-5}$ to $1.0 \times 10^{-7}$ μm², and further preferably $1.0 \times 10^{-5}$ to $1.0 \times 10^{-6}$ μm². Since the area is $1.0 \times 10^{-4}$ μm² or more, the amount of the ink necessary for printing tends to be secured, and since the above amount is $1.0 \times 10^{-7}$ μm² or less, the decrease in flow rate of the ink flowing in the flow path tends to be suppressed. Furthermore, the length of the flow path 127 is preferably 1.0 to 600 μm, more preferably 2.0 to 400 μm, and further preferably 5.0 to 300 μm. Since the length is 1.0 μm or more, a stable continuous ejection tends to be realized, and since the length is 600 μm or less, a minimum pressure necessary for ejection tends to be applied.

In the ejection head 101 shown in FIG. 3, a compliance sheet 140 is used as a member forming a part of the ink flow path. The compliance sheet 140 is a flexible elastic film. Although the compliance sheet 140 is not particularly limited as long as being a film having elasticity, as a concrete example, a high molecular weight film, a thin film formed from a metal, a film formed from glass fibers, and a film formed from carbon fibers may be mentioned. As a material of the high molecular weight film, in particular, there may be mentioned a polyimide, a nylon, a polyolefin, and a poly (phenylene sulfide). In addition, as the metal, in particular, iron and a material containing aluminum may be mentioned.

The thickness of the compliance sheet 140 is preferably 50 μm or less, more preferably 20 μm or less, and further preferably 1.0 to 10 μm. The compliance sheet 140 is preferably formed of a poly(phenylene sulfide). Since the compliance sheet 140 has the above predetermined thickness or more, the vibration at the ejection of the ink composition is suppressed from being increased, and hence, the generation of residual vibration can be suppressed. The compliance sheet 140 has a function as a damper for the ejection and the transport of the ink composition. In addition, when the volume of the ink composition is expanded, since being deformed thereby, the compliance sheet 140 has a function to suppress the damage done to the ejection head 101.

The ejection heads 101 each have a cover 150. The cover 150 described above is formed as a member other than a housing not shown. The cover 150 is provided in direct contact with the vibration plate 30, forms a space receiving the piezoelectric element 32, and receives the piezoelectric element 32 in this space. A material of the cover 150 is the same as the material of the housing 130 described above. The cover 150 has a function to separate the piezoelectric element 32 from an outside environment, and an inert gas may be sealed in the space formed by the cover 150, or the pressure in the space described above may be reduced. Accordingly, a piezoelectric material of the piezoelectric element 32 can be suppressed, for example, from being degraded.

EXAMPLES

Hereinafter, although this embodiment will be described in more detail with reference to Examples and Comparative Examples, as long as without departing from the scope of this embodiment, this embodiment is not limited to the following Examples and Comparative Examples.

Preparation of Aluminum Pigment Dispersion Liquid A

First, a film (surface roughness Ra was 0.02 μm or less) formed of a poly(ethylene terephthalate) having a flat surface was prepared.

Next, a silicone oil is applied to the entire one side surface of this film. On the surface side to which a release coating agent, such as this silicone oil or a methacrylate, is applied, a film (hereinafter, simply referred to as "aluminum film" in some cases) formed from aluminum using a deposition method was formed.

Next, after the film on which the aluminum film was formed was placed in diethylene glycol diethyl ether and was then irradiated with ultrasonic waves, the aluminum film was peeled away from the film and pulverized. Subsequently, this aluminum was charged into a homogenizer and then processed by a pulverization treatment for approximately 8 hours, so that a dispersion liquid of flat-shaped aluminum particles (mother particles) was obtained. The concentration of the aluminum particles in this dispersion liquid was 10 percent by mass.

Next, after 100 parts by mass of diethylene glycol diethyl ether was added to 100 parts by mass of the dispersion liquid containing aluminum particles thus obtained so that the concentration of the aluminum particles was adjusted to 5 percent by mass, 20 parts by mass of $CF_3(CF_2)_5(CH_2)_2O(P)(OH)_2$ functioning as a fluorine-based phosphonic acid compound was added to 100 parts by mass of the aluminum particles, and a surface treatment of the aluminum particles was performed at a liquid temperature of 55° C. for 3 hours while ultrasonic waves were irradiated, so that a dispersion liquid containing 5 percent by mass of the aluminum particles was obtained.

By the use of a laser diffraction scattering particle size distribution meter Microtrac MT3000 (manufactured by Nikkiso Co., Ltd.), when the aluminum particles in the dispersion liquid were measured under the measurement conditions: "particle permeability: reflection", the average particle diameter was 0.45 μm (450 nm). In addition, the thickness of the aluminum particles was measured by the following method using a transmission electron microscope. The dispersion liquid was applied to a silicon substrate and was then spontaneously dried for one day. Next, by the use of a focused ion beam (FIB) apparatus, after a cross-sectional sample of the aluminum pigment was formed, the cross-section was observed by a transmission electron microscope (FEI Company, Tecnai G2 F30), so that the thickness was measured. After 30 samples were measured, among the measurement values thus obtained, the thicknesses of three samples ranked as the top and the thicknesses of three samples ranked as the bottom were excluded, and the arithmetic average of the 24 samples was investigated, so that the average thickness was measured. As a result, the average thickness was 14.6 nm.

Finally, a mixture of hexylene glycol and water was added to the dispersion liquid containing the aluminum particles described above and was then processed by a stirring treatment with ultrasonic waves, so that an aluminum pigment dispersion liquid A containing an aluminum pigment A was obtained.

Preparation of Aluminum Pigment Dispersion Liquid B

Except for that the average particle diameter and the average thickness of the aluminum particles were changed, by a procedure similar to that of the preparation of the aluminum particle dispersion liquid A, an aluminum pigment dispersion liquid B containing an aluminum pigment B which had an average particle diameter of 0.60 μm (900 nm) and an average thickness of 30.5 nm was obtained.

Preparation of Aluminum Pigment Dispersion Liquid C

Except for that the average particle diameter and the average thickness of the aluminum particles were changed, by a procedure similar to that of the preparation of the aluminum particle dispersion liquid A, an aluminum pigment dispersion liquid C containing an aluminum pigment B which had an average particle diameter of 0.95 μm (950 nm) and an average thickness of 82.5 nm was obtained.

Preparation of Aluminum Pigment Dispersion Liquid D

Except for that the surface treatment of the aluminum particles was performed using $CF_3(CF_2)_3(CH_2)_2O(P)(OH)_2$ as the fluorine-based phosphonic acid compound, by a procedure similar to that of the preparation of the aluminum pigment dispersion liquid A, an aluminum pigment dispersion liquid D containing an aluminum pigment D which had an average particle diameter of 0.45 μm (450 nm) and an average thickness of 14.6 nm of the aluminum particles was obtained.

Preparation of Solvent-Based Ink Composition

After materials were mixed together to obtain the compositions shown in the following Table 1, stirring was sufficiently performed, so that the compositions were obtained. In addition, in the following Table 1, the unit of the numerical value indicates percent by mass, and the total indicates 100.0 percent by mass.

Primary materials of the solvent-based ink compositions used in Examples and Comparative Examples in Table 1 are as shown below.

Polyoxyethylene Alkyl Ether Phosphoric Acid Compound

PLYSURF A212C (poly(10)oxyethylene tridecyl ether phosphoric acid, the number of carbon atoms of the ether chain: 13, trade name, manufactured by DKS Co., Ltd.)

PLYSURF M208F (poly(10)oxyethylene tridecyl ether phosphoric acid amine, the number of carbon atoms of the ether chain: 8, trade name, manufactured by DKS Co., Ltd.)

PLYSURF A208F (poly(10)oxyethylene tridecyl ether phosphoric acid, the number of carbon atoms of the ether chain: 8, trade name, manufactured by DKS Co., Ltd.)

PLYSURF A219B (poly(10)oxyethylene tridecyl ether phosphoric acid, the number of carbon atoms of the ether chain: 12, trade name, manufactured by DKS Co., Ltd.)

NIKKOL DDP-2 (poly(2)oxyethylene alkyl ether phosphoric acid, the number of carbon atoms of the ether chain: 12-15, trade name, manufactured by Nikko Chemicals Co., Ltd.)

NIKKOL DDP-10 (poly(10)oxyethylene alkyl ether phosphoric acid, the number of carbon atoms of the ether chain: 12-15, trade name, manufactured by Nikko Chemicals Co., Ltd.)

NIKKOL DLP-10 (poly(10)oxyethylene lauryl ether sodium phosphate, the number of carbon atoms of the ether chain: 12, trade name, manufactured by Nikko Chemicals Co., Ltd.)

NIKKOL DOP-8NV (poly(8)oxyethylene oleyl ether sodium phosphate, the number of carbon atoms of the ether chain: 18, trade name, manufactured by Nikko Chemicals Co., Ltd.)

NIKKOL TLP-4 (polyoxyethylene lauryl ether sodium phosphate, trade name, manufactured by Nikko Chemicals Co., Ltd.)

Other Compound

Silanol-modified silicone (dual-end silanol-terminated dimethyl silicone oil, manufactured by Shin-Etsu Chemical Co., Ltd., trade name: "X-21-5841")

Organic Solvent

Diethylene glycol diethyl ether (manufactured by Nippon Nyukazai Co., Ltd.)

Diethylene glycol methyl ethyl ether (manufactured by Nippon Nyukazai Co., Ltd.)

Triethylene glycol monobutyl ether (manufactured by Nippon Nyukazai Co., Ltd.)

γ-butyrolactone (manufactured by Mitsubishi Chemical Corporation)

Dimethyl imidazolidinone (manufactured by Mitsui Chemicals Inc.)

2-pyrrolidone (manufactured by Mitsubishi Chemical Corporation)

Ejection Stability

After a liquid droplet ejection apparatus installed in a chamber (thermal chamber) and the compositions of the above Examples and Comparative Examples were prepared, and a drive waveform of a piezoelectric element was optimized, in an environment at 25° C. and 50% RH, liquid droplet ejection of each recorded material-manufacturing composition was performed from all nozzles of a liquid droplet ejection head each having an nozzle hole diameter of 22 μm while the number of vibration (frequency) of the piezoelectric element was changed. The liquid droplet ejection time at each frequency was set to one minute. At the point at which the ejection was performed for one minute, a frequency at which the number of nozzles which ejected no composition was less than 0.5% of the number of all the nozzles and at which the number of nozzles showing malfunctions, such as delay and ejection curving, is less than 0.5% of the number of all the nozzles was regarded as a practically usable maximum frequency, and the ejection stability was evaluated in accordance with the following four levels of the practically usable frequency range. As this value is increased, the frequency characteristics are regarded as improved. The evaluation results are shown in Table 1.

A: 15 kHz or more
B: 11 kHz to less than 15 kHz
C: 5 kHz to less than 11 kHz
D: 3 kHz to less than 5 kHz
E: less than 3 kHz Glossy Property After the composition thus obtained was applied to a substrate (vinyl chloride sheet TJ5829R (MACTA)) by a bar coater #6, was then dried at 50° C. for 2 minutes, and was further left at room temperature for 24 hours, the glossiness at 60° was measured using a glossy meter manufactured by HORIBA, Ltd. Based on the results thus obtained and the following evaluation criteria, the glossy property was evaluated. The evaluation results are shown in Table 1.

A: 300 or more
B: 250 to less than 300
C: 150 to less than 250
D: less than 150

Appearance

The composition of each of the above Examples and Comparative Examples was charged in an ink jet printer (manufactured by Seiko Epson Corporation, model type: "SC-S70650" and was then ejected from an ink jet head, so that a solid pattern (S dot, 720×720 dpi) was continuously formed for 30 seconds on a vinyl chloride sheet TJ5829R (MACTACT) functioning as a recording medium. After the printing was performed, drying was performed on a hot plate at 50° C. for 20 minutes, and the solid pattern thus obtained was compared with boundary samples based on the following evaluation criteria by visual inspection, so that the appearance of the solid pattern thus obtained was evaluated. The evaluation results are shown in Table 1.

A: The pattern has an excellent glossy touch and a significantly excellent appearance.

B: The pattern has a glossy touch and an excellent appearance.

C: The pattern has a glossy touch and a preferable appearance.

D: The pattern has an inferior glossy touch and a slightly inferior appearance.

E: The pattern has an inferior glossy touch and an inferior appearance.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Dispersion Liquid | Dispersion Liquid A 15.0 | Dispersion Liquid A 15.0 | Dispersion Liquid A 15.0 | Dispersion Liquid A 15.0 | Dispersion Liquid A 12.0 | Dispersion Liquid A 12.0 | Dispersion Liquid A 12.0 | Dispersion Liquid A 12.0 | Dispersion Liquid A 12.0 | Dispersion Liquid A 12.0 |
| PLYSURF A212C | 1.5 | 8.0 | 0.2 | — | — | — | 0.2 | 0.2 | 0.2 | 0.2 |
| PLYSURF M208F | — | — | — | 1.5 | — | — | — | — | — | — |
| PLYSURF A208F | — | — | — | — | 3.0 | — | — | — | — | — |
| PLYSURF A219B | — | — | — | — | — | 3.0 | — | — | — | — |
| NIKKOL DDP-2 | — | — | — | — | — | — | 1.5 | — | — | — |
| NIKKOL DDP-10 | — | — | — | — | — | — | — | 1.5 | — | — |
| NIKKOL DLP-10 | — | — | — | — | — | — | — | — | 1.5 | — |
| NIKKOL DOP-8NV | — | — | — | — | — | — | — | — | — | 1.5 |
| TLP-4 | — | — | — | — | — | — | — | — | — | — |
| Silanol-Modified Silicone | — | — | — | — | — | — | — | — | — | — |
| Diethylene Glycol Diethyl Ether | 72.5 | 66.0 | 73.8 | 65.5 | 64.0 | 61.0 | 53.3 | 61.3 | 10.0 | 61.3 |
| Diethylene Glycol Methyl Ethyl Ether | 0.0 | 0.0 | 0.0 | 0.0 | 10.0 | 10.0 | 10.0 | 10.0 | 61.3 | 10.0 |
| Triethylene Glycol Monobutyl Ether | 8.0 | 8.0 | 8.0 | 8.0 | 5.0 | 5.0 | 5.0 | 5.0 | 10.0 | 10.0 |
| γ-Butyrolactone | 3.0 | 3.0 | 3.0 | 10.0 | 3.0 | 3.0 | 15.0 | 5.0 | 5.0 | 5.0 |
| 2-Pyrrolidone | 0.0 | 0.0 | 0.0 | 0.0 | 0.0 | 3.0 | 3.0 | 5.0 | 0.0 | 0.0 |
| Dimethyl imidazolidinone | 0.0 | 0.0 | 0.0 | 0.0 | 3.0 | 3.0 | 0.0 | 0.0 | 0.0 | 0.0 |
| Ejection Stability | A | A | A | A | A | B | A | A | B | B |
| Glossy Property | A | A | A | A | A | B | C | B | A | A |
| Appearance | A | B | A | B | A | B | B | A | B | B |

| | Example 11 | Example 12 | Example 13 | Example 14 | Comparative Example 1 | Comparative Example 2 | Comparative Example 3 | Comparative Example 4 | Comparative Example 5 |
|---|---|---|---|---|---|---|---|---|---|
| Dispersion Liquid | Dispersion Liquid A 12.0 | Dispersion Liquid B 15.0 | Dispersion Liquid C 15.0 | Dispersion Liquid D 15.0 | Dispersion Liquid A 15.0 | Dispersion Liquid A 15.0 | Dispersion Liquid A 15.0 | Dispersion Liquid A 15.0 | Dispersion Liquid D 15.0 |
| PLYSURF A212C | — | 1.5 | 1.5 | 1.5 | — | — | 0.5 | — | — |
| PLYSURF M208F | — | — | — | — | — | 0.05 | 15.0 | — | — |
| PLYSURF A208F | — | — | — | — | — | — | — | — | — |
| PLYSURF A219B | — | — | — | — | — | — | — | — | — |
| NIKKOL DDP-2 | — | — | — | — | — | — | — | — | — |
| NIKKOL DDP-10 | — | — | — | — | — | — | — | — | — |
| NIKKOL DLP-10 | — | — | — | — | — | — | — | — | — |
| NIKKOL DOP-8NV | — | — | — | — | — | — | — | — | — |
| TLP-4 | 1.5 | — | — | — | — | — | — | — | — |
| Silanol-Modified Silicone | — | — | — | — | — | — | — | 5.0 | — |
| Diethylene Glycol Diethyl Ether | 72.5 | 72.5 | 72.5 | 72.5 | 67.0 | 66.95 | 51.5 | 62.0 | 67.0 |
| Diethylene Glycol Methyl Ethyl Ether | 0.0 | 0.0 | 0.0 | 0.0 | 0.0 | 0.0 | 0.0 | 0.0 | 0.0 |

TABLE 1-continued

| | | | | | | | | | |
|---|---|---|---|---|---|---|---|---|---|
| Triethylene Glycol Monobutyl Ether | 10.0 | 8.0 | 8.0 | 8.0 | 8.0 | 8.0 | 8.0 | 8.0 | 8.0 |
| γ-Butyrolactone | 3.0 | 3.0 | 3.0 | 3.0 | 10.0 | 10.0 | 10.0 | 10.0 | 10.0 |
| 2-Pyrrolidone | 1.0 | 0.0 | 0.0 | 0.0 | 0.0 | 0.0 | 0.0 | 0.0 | 0.0 |
| Dimethyl imidazolidinone | 0.0 | 0.0 | 0.0 | 0.0 | 0.0 | 0.0 | 0.0 | 0.0 | 0.0 |
| Ejection Stability | B | A | B | A | C | C | D | E | C |
| Glossy Property | A | B | B | A | B | B | E | D | B |
| Appearance | B | A | B | A | C | C | D | D | C |

By the comparison between Examples and Comparative Examples shown in Table 1, it was found that according to the solvent-based ink composition of the present invention, an excellent ejection stability could be obtained, and furthermore, a coating film having an excellent glossy property could also be obtained.

The entire disclosure of Japanese Patent Application No. 2017-002690 filed on Jan. 11, 2017 is expressly incorporated by reference herein.

The invention claimed is:

1. A solvent-based ink composition comprising:
an organic solvent;
a surface-treated metal powder; and
a polyoxyethylene alkyl ether phosphoric acid compound,
wherein the content of the polyoxyethylene alkyl ether phosphoric acid compound with respect to the total mass of an ink is 0.1 to 10.0 percent by mass,
the surface-treated metal powder contains aluminum or an aluminum alloy and is surface-treated by a surface treating agent of a fluorine-based compound, and
wherein the polyoxyethylene alkyl ether phosphoric acid compound is a compound represented by the following formula or a salt thereof;
$RO[(CH_2CH_2O)_n]_mPO(OH)_{3-m}$,
where R represents an alkyl group having 13 to 18 carbon atoms, n indicates an integer of 1 or more, and m indicates an integer of 1 to 3.

2. The solvent-based ink composition according to claim 1, wherein
R represents an alkyl group having 13 carbon atoms.

3. The solvent-based ink composition according to claim 2, wherein in the polyoxyethylene alkyl ether phosphoric acid compound, n in the above formula indicates an integer of 1 to 25.

4. The solvent-based ink composition according to claim 1, wherein the average particle diameter of the surface-treated metal powder, which is calculated on a volume basis, is 0.2 to 1.0 μm.

5. The solvent-based ink composition according to claim 1, wherein the shape of the surface-treated metal powder is flaky.

6. The solvent-based ink composition according to claim 5, wherein the average thickness of the surface-treated metal powder is 10 to 90 nm.

7. The solvent-based ink composition according to claim 2, wherein the average particle diameter of the surface-treated metal powder, which is calculated on a volume basis, is 0.2 to 1.0 μm.

8. The solvent-based ink composition according to claim 3, wherein the average particle diameter of the surface-treated metal powder, which is calculated on a volume basis, is 0.2 to 1.0 μm.

9. The solvent-based ink composition according to claim 2, wherein the shape of the surface-treated metal powder is flaky.

10. The solvent-based ink composition according to claim 3, wherein the shape of the surface-treated metal powder is flaky.

11. The solvent-based ink composition according to claim 4, wherein the shape of the surface-treated metal powder is flaky.

* * * * *